(12) United States Patent
Evans (10) Patent No.: US 6,513,708 B2
(45) Date of Patent: Feb. 4, 2003

(54) MATHEMATICS TEACHING SYSTEM (76) Inventor: Elizabeth A. Evans, 99-337 Uwau Dr., Aiea, HI (US) 96701

( * ) Notice: Subject to any disclaimer, the term of this patent is extended or adjusted under 35 U.S.C. 154(b) by 84 days.

(21) Appl. No.: 09/735,040

(22) Filed: Dec. 11, 2000

(65) Prior Publication Data
US 2002/0109006 A1 Aug. 15, 2002

(51) Int. Cl.$^7$ ................................................ B43K 29/08
(52) U.S. Cl. ........................ 235/64; 235/68; 235/136; 434/168; 434/208; 273/241; 273/271; 35/30; 35/31
(58) Field of Search ................................ 273/284, 283, 273/271, 290, 153; 235/136; 434/208, 188, 195; 35/77, 31

(56) References Cited

U.S. PATENT DOCUMENTS

| 3,777,415 A | 12/1973 | Gariety et al. |
| 3,984,108 A | 10/1976 | Marzo |
| 5,149,102 A | 9/1992 | McGowan et al. |
| 5,366,226 A | 11/1994 | McGowan et al. |
| 5,413,484 A | 5/1995 | Banerjee, Sr. et al. |
| 5,542,673 A | * 8/1996 | Lammertink ............ 273/153 S |
| 5,707,239 A | 1/1998 | Butler |
| 5,772,209 A | 6/1998 | Thompson |
| 5,971,269 A | * 10/1999 | Baguley ..................... 235/136 |

* cited by examiner

Primary Examiner—Karl D. Frech
Assistant Examiner—Edwyn Labaze
(74) Attorney, Agent, or Firm—Michael S. Neustel (57) ABSTRACT A mathematics teaching system for visually and physically teaching a student how to perform multiplication and division calculations in a simple to understand format. The mathematics teaching system includes a housing having a plurality of apertures aligned in vertical and horizontal rows, an upper opening within the housing for inserting tokens into, a lower opening for allowing tokens to escape, a vertical slot and a horizontal slot within the housing for receiving slider members, a plurality of vertical reference numerals and a plurality of horizontal reference numerals, and a stopper member slidably positioned within a lower portion of the housing for retaining the tokens in a desired location for allowing calculation by a student.

18 Claims, 6 Drawing Sheets

MATHEMATICS TEACHING SYSTEM

BACKGROUND OF THE INVENTION

1. Field of the Invention

The present invention relates generally to mathematics devices and more specifically it relates to a mathematics teaching system for visually and physically teaching a student how to perform multiplication and division calculations in a simple to understand format.

2. Description of the Prior Art

Conventional mathematics calculation systems have been in use for years. Most conventional mathematics calculation systems focus upon the concept of "memorizing" a specific calculation instead of educating the student to understand the fundamental concepts behind the calculation. For example, conventional mathematics calculation systems teach students to memorize that 4×4=16 instead of teaching them the fundamental concepts behind this calculation. The same applies to division problems such as 16/4=4.

The main problem with conventional mathematics calculation systems is that they are not scalable and therefore do not teach the student how to calculate variations of the memorized calculation. Another problem with conventional mathematics calculation systems is that they require the student to "memorize" numerous calculations which is difficult and unpleasing to many students making learning difficult.

Examples of patented mathematics learning devices which are illustrative of such prior art include U.S. Pat. No. 5,366,226 to McGowan et al.; U.S. Pat. No. 5,149,102 to McGowan et al.; U.S. Pat. No. 5,772,209 to Thompson; U.S. Pat. No. 5,707,239 to Butler; U.S. Pat. No. 5,413,484 to Banerjee, Sr. et al.; U.S. Pat. No. 3,984,108 to Marzo; U.S. Pat. No. 3,777,415 to Gariety et al.

While these devices may be suitable for the particular purpose to which they address, they are not as suitable for visually and physically teaching a student how to perform multiplication and division calculations in a simple to understand format. Conventional mathematics teaching devices are difficult to utilize and require the student to "memorize" specific mathematic calculations instead of learning the fundamental concepts behind the calculation.

In these respects, the mathematics teaching system according to the present invention substantially departs from the conventional concepts and designs of the prior art, and in so doing provides an apparatus primarily developed for the purpose of visually and physically teaching a student how to perform multiplication and division calculations in a simple to understand format.

SUMMARY OF THE INVENTION

In view of the foregoing disadvantages inherent in the known types of mathematic teaching devices now present in the prior art, the present invention provides a new mathematics teaching system construction wherein the same can be utilized for visually and physically teaching a student how to perform multiplication and division calculations in a simple to understand format.

The general purpose of the present invention, which will be described subsequently in greater detail, is to provide a new mathematics teaching system that has many of the advantages of the mathematic teaching devices mentioned heretofore and many novel features that result in a new mathematics teaching system which is not anticipated, rendered obvious, suggested, or even implied by any of the prior art mathematic teaching devices, either alone or in any combination thereof.

To attain this, the present invention generally comprises a housing having a plurality of apertures aligned in vertical and horizontal rows, an upper opening within the housing for inserting tokens into, a lower opening for allowing tokens to escape, a vertical slot and a horizontal slot within the housing for receiving slider members, a plurality of vertical reference numerals and a plurality of horizontal reference numerals, and a stopper member slidably positioned within a lower portion of the housing for retaining the tokens in a desired location for allowing calculation by a student.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a mathematics teaching system that will overcome the shortcomings of the prior art devices.

A second object is to provide a mathematics teaching system for visually and physically teaching a student how to perform multiplication and division calculations in a simple to understand format.

Another object is to provide a mathematics teaching system that is simple and easy to utilize for most students.

An additional object is to provide a mathematics teaching system that teaches the fundamental concepts of multiplication, division, subtraction and addition calculations.

A further object is to provide a mathematics teaching system that is able to be utilized by visually impaired students.

A further object is to provide a mathematics teaching system that does not require the student to "memorize" specific calculations.

Another object is to provide a mathematics teaching system that provides the student with a scalable learning device for multiplication and division.

A further object is to provide a mathematics teaching system that assists students of all learning capabilities to visualize and manipulate multiplication and division calculations.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DESCRIPTION OF THE PREFERRED EMBODIMENT

A. Structure

Turning now descriptively to the drawings, in which similar reference characters denote similar elements throughout the several views, FIGS. 1 through 9 illustrate a mathematics teaching system 10, which comprises a housing 20 having a plurality of apertures 26 aligned in vertical and horizontal rows, an upper opening 21 within the housing 20 for inserting tokens 80 into, a lower opening 23 for allowing tokens 80 to escape, a vertical slot and a horizontal slot within the housing 20 for receiving slider members, a plurality of vertical reference numerals 25 and a plurality of horizontal reference numerals 27, and a stopper member 60 slidably positioned within a lower portion of the housing 20 for retaining the tokens 80 in a desired location for allowing calculation by a student.

As shown in FIGS. 1 through 4 of the drawings, the housing 20 is a generally rectangular shaped structure having an upper opening 21 and a lower opening 23. The housing 20 is further comprised of a front plate 24, a rear plate 28, a pair of side members 22, and a plurality of partition members 29 extending vertically between the front plate 24 and the rear plate 28 defining a plurality of channels within the housing 20 that extend from the upper opening 21 to the lower opening 23. The channels formed between the plurality of partition members 29 are wide enough to slidably receive a plurality of tokens 80 inserted through the upper opening 21.

Figure 1:
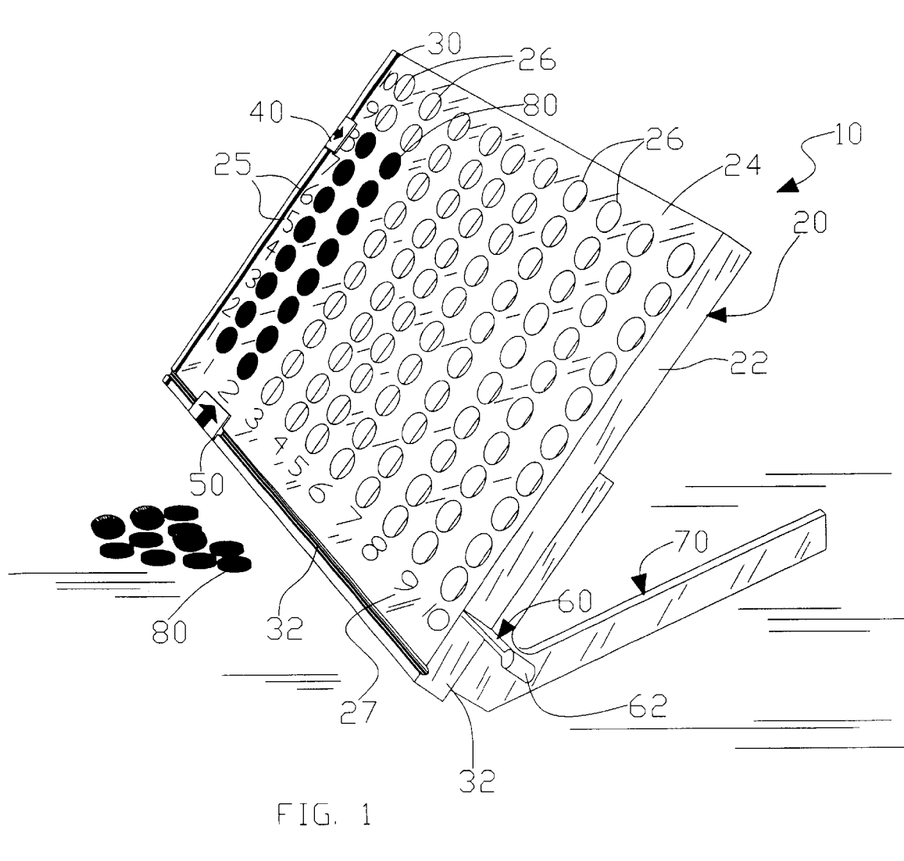
FIG. 1 is an upper perspective view of the present invention.
Figure 9:
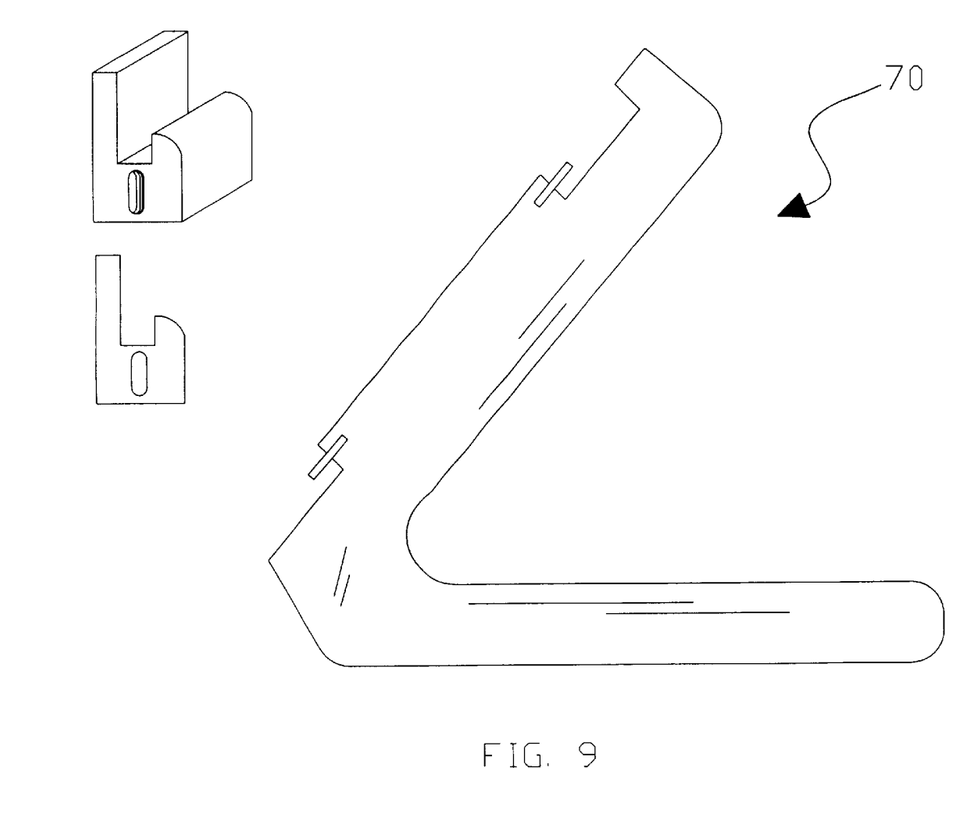
FIG. 9 is an exploded upper perspective view of the rear support structure.

As shown in FIGS. 1 and 9 of the drawings, a rear support structure 70 is removably attachable to the rear plate 28 of the housing 20 to support the housing 20 in an inclined manner. The inclined structure of the housing 20 allows the tokens 80 within to fall through the lower opening 23 when released by the stopper member 60.

Figure 2:
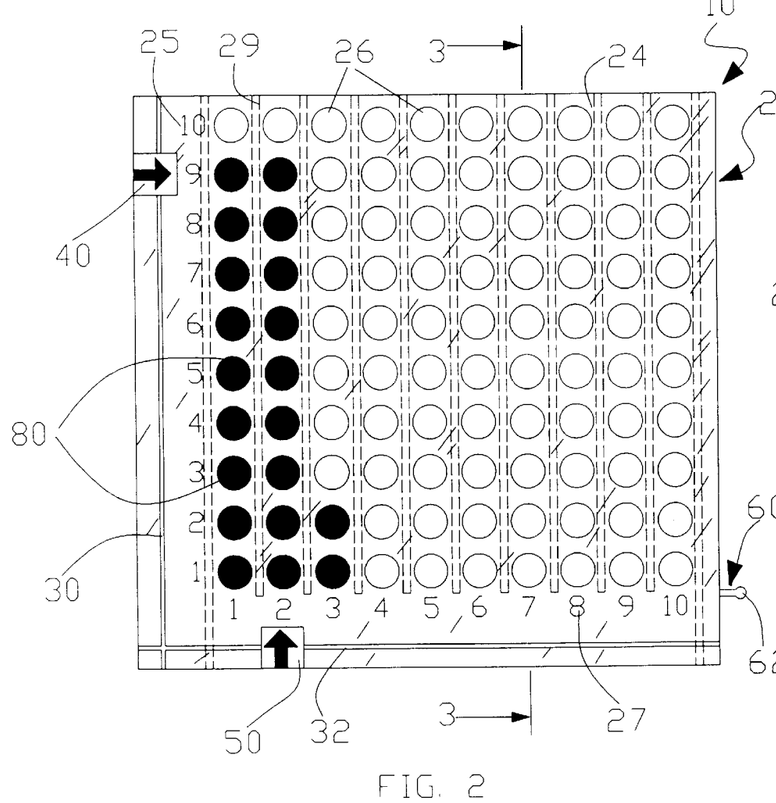
FIG. 2 is a front view of the present invention.

As shown in FIGS. 1 through 5 of the drawings, the front plate 24 includes a plurality of apertures 26 aligned in vertical and horizontal rows. The apertures 26 are formed to show a portion of the tokens 80 positioned within the channels defined by the partition members 29. As shown in FIG. 2 of the drawings, there are preferably ten vertical and ten horizontal rows of apertures 26, however it can be appreciated that various other number combinations of rows may be utilized for the present invention.

A plurality of vertical reference numerals 25 are positioned upon the outer surface of the front plate 24 adjacent each of the horizontal rows as best shown in FIG. 2 of the drawings. A plurality of horizontal reference numerals 27 are positioned upon the outer surface of the front plate 24 adjacent each of the vertical rows as further shown in FIG. 2 of the drawings. The reference numerals 25, 27 are each sequentially numbered one through ten as shown in FIG. 2 of the drawings indicating the numbers being computed.

Figure 5:
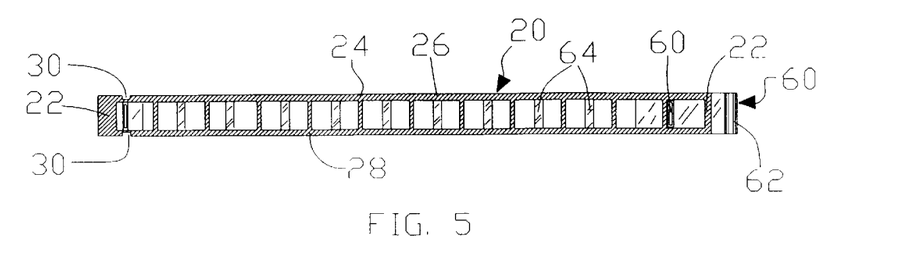
FIG. 5 is a cross sectional view taken along line 5—5 of FIG. 4.
Figure 8A:
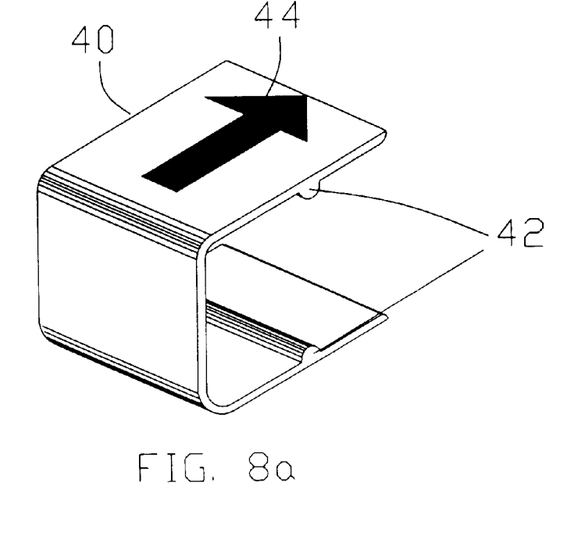
FIG. 8a is an upper rear perspective view of a slider member.
Figure 8B:
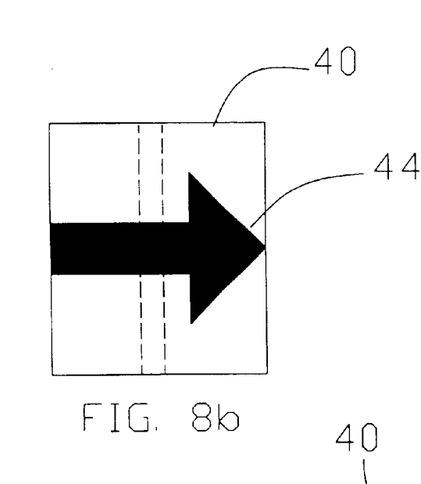
FIG. 8b is a front view of the slider member.
Figure 8C:
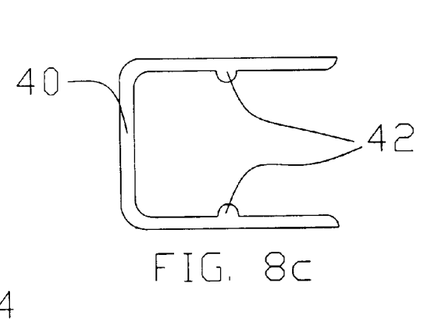
FIG. 8c is a side view of the slider member.

As shown in FIGS. 1, 2 and 5 of the drawings, a pair of vertical slots 30 extend along a left portion of the front plate 24 and the rear plate 28 for slidably receiving a vertical slider member 40. The vertical slider member 40 is preferably constructed of a U-shaped structure as shown in FIGS. 8a and 8c of the drawings. The vertical slider member 40 includes a pair of opposing ridge members 42 that correspond to the pair of vertical slots 30 within the front plate 24 and the rear plate 28 thereby guiding the vertical slider member 40 upon the housing 20. The vertical slider member 40 further includes an arrow 44 within an upper surface thereof for pointing to a specific vertical reference numeral 25.

Figure 3:
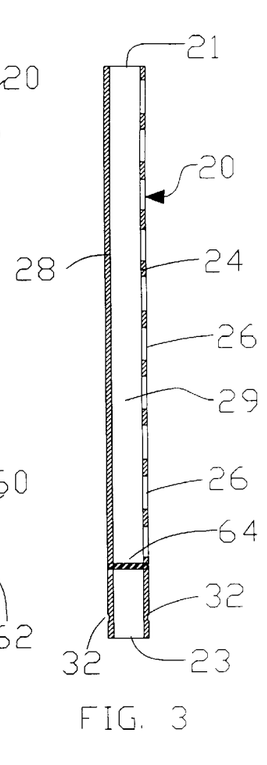
FIG. 3 is a cross sectional view taken along line 3—3 of FIG. 2.

As shown in FIGS. 1 through 3 of the drawings, a pair of horizontal slots 32 extend along a lower portion of the front plate 24 and the rear plate 28 for slidably receiving a horizontal slider member 50. The horizontal slots 32 are traverse to the vertical slots 30 as best shown in FIGS. 1 and 2 of the drawings. The horizontal slider member 50 is preferably constructed of a U-shaped structure similar to the vertical slider member 40 shown in FIGS. 8a–c. The horizontal slider member 50 includes a pair of opposing ridge members 42 that correspond to the pair of horizontal slots 32 within the front plate 24 and the rear plate 28 thereby guiding the horizontal slider member 50 upon the housing 20. The horizontal slider member 50 further includes an arrow 44 within an upper surface thereof for pointing to a specific horizontal reference numeral 25.

Figure 6:
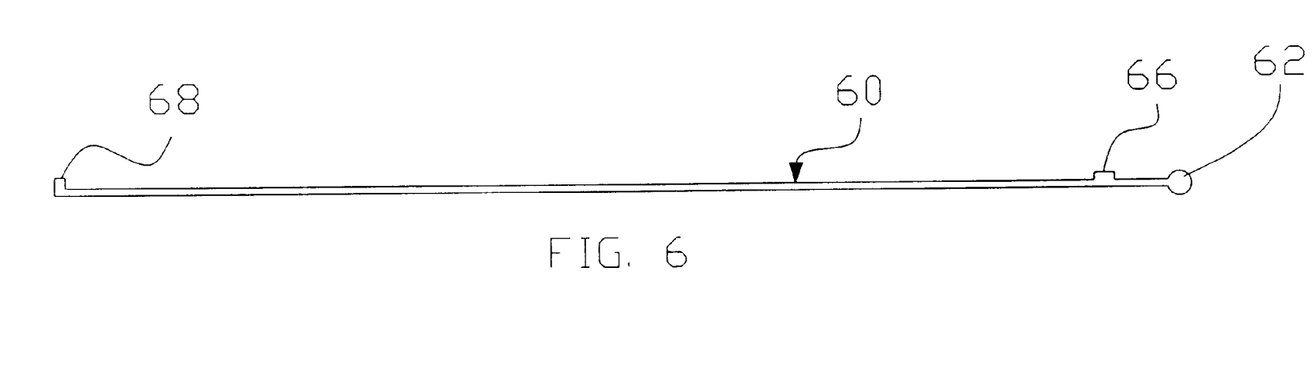
FIG. 6 is a side view of the stopper member.
Figure 7:
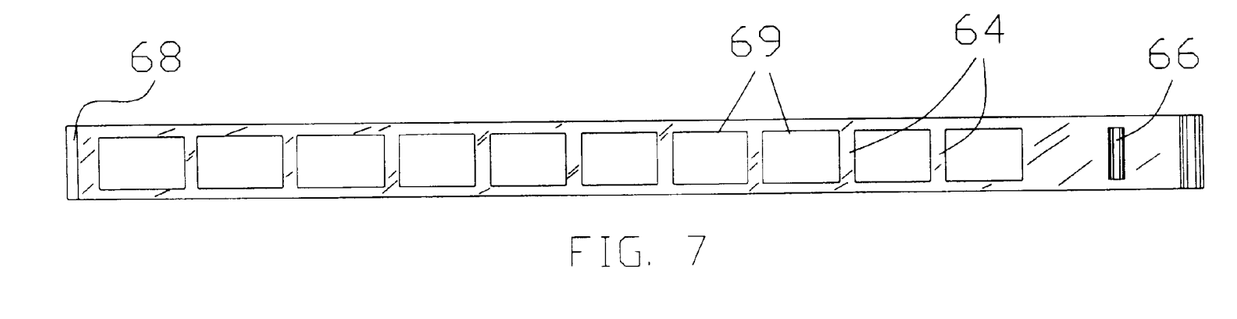
FIG. 7 is a top view of the stopper member.

As shown in FIGS. 6 and 7 of the drawings, a stopper member 60 is an elongate structure having a plurality of openings 69 defined by a plurality of cross members 64. The openings 69 are formed to allow the tokens 80 to fall through the openings 69 when the stopper member 60 is properly positioned thereby allowing the release of the tokens 80 within the housing 20. The stopper member 60 further includes a handle 62 at a distal end of the stopper member 60 for allowing a user to easily grasp for releasing the tokens 80 from the housing 20. The distal end of the stopper member 60 opposite of the handle 62 includes an end flange 68 for preventing the stopper member 60 from being completely removed from the housing 20.

Figure 4:
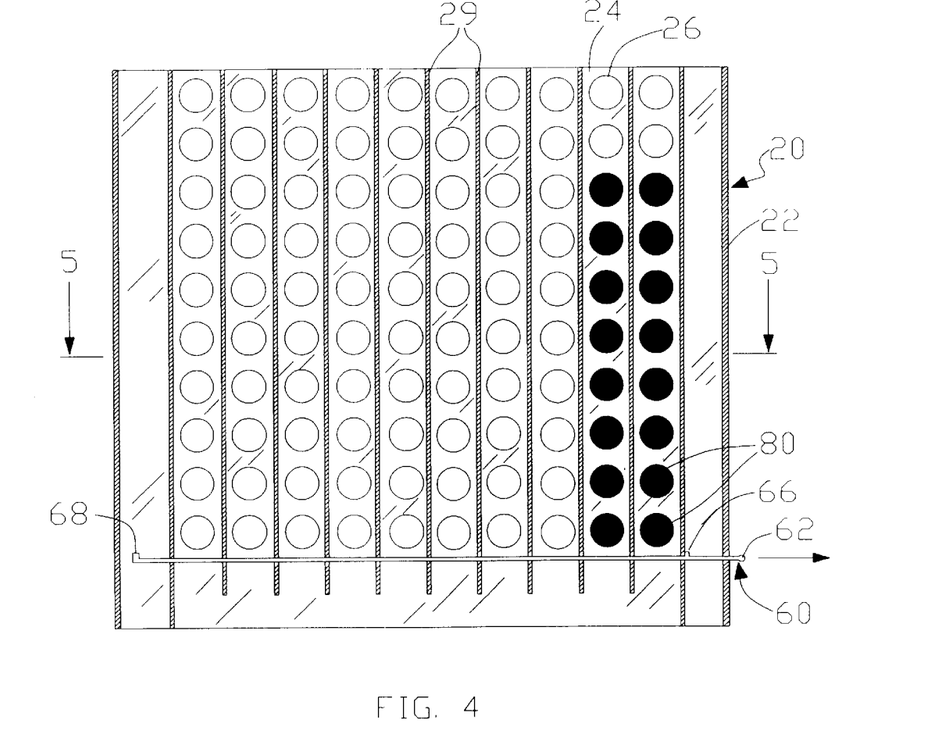
FIG. 4 is a cutaway rear view of the present invention.

The stopper member 60 further includes a nub 66 attached thereto adjacent the handle 62 for allowing proper positioning of the stopper member 60 to align the cross members 64 within the channel to prevent the passage of the tokens 80 as shown in FIGS. 4 and 5 of the drawings. The stopper member 60 is slidably extended through a lower portion of the housing 20 near the lower opening 23 to control the flow and passage of the tokens 80 within during usage by the student. The stopper member 60 slidably extends through one of the side members 22 and the plurality of partition members 29 with the end flange 68 and the nub 66 selectively engaging the partition members 29 to properly align the openings 69 and the cross members 64 within the channels defined by the partition members 29 during operation thereof.

B. Multiplication Calculations

To utilize the invention for calculating a multiplication problem, the user first aligns the vertical slider member 40 with respect to the first number to be multiplied represented by one of the vertical reference numerals 25 and the horizontal slider member 50 with respect to the second number to be multiplied represented by one of the horizontal reference numerals 27. The student then inserts the tokens 80 into the first channel defined by horizontal reference numeral 1 until the tokens 80 are at a height equal to the vertical slider member 40. The student would then continue inserting tokens 80 into the next channel until the vertical row represented by the horizontal slider member 50 was filled in up to the vertical slider member 40. The student can simply add the number of tokens 80 inserted into the channels through the upper opening 21 during or after insertion. The total number of tokens 80 inserted into the housing 20 represents the answer to the multiplication problem.

For example, if the student was to calculate value of 8×2, the student would first position the vertical slider member 40 to the vertical reference numeral 25 identified as 8 and then position the horizontal slider member 50 to the horizontal reference numeral 27 identified as 2. The user would then insert tokens 80 into the first channel on the left side of the housing 20 until the height of the tokens 80 equaled the position of the vertical slider member 40. The user would then insert tokens 80 into the second channel of the housing 20 identified with the horizontal slider member 50 until the height of the tokens 80 equaled the position of the vertical slider member 40 as shown in FIG. 1 of the drawings. Either during or after the insertion of the tokens 80 the student would add the total number of tokens 80 inserted into the housing 20 which is 16 which is the answer to the multiplication equation of 8×2. After the student is finished calculating, the student then may grasp the stopper member 60 pulling the stopper member 60 outwardly from the housing 20 until the end flange 68 engages one of the partition members 29 which then aligns the openings 69 of the stopper member 60 with the channels within the housing 20 thereby allowing the release of the tokens 80 through the openings 69 through the lower opening 23 of the housing 20 onto a surface. The student then repositions the stopper member 60 inwardly to realign the cross members 64 with the channels to prevent future tokens 80 from fall through the lower opening 23 within the housing 20 as shown in FIGS. 4 and 5 of the drawings.

C. Division Calculations

To utilize the invention for calculating a division problem, the user first aligns the vertical slider member 40 with respect to the first number to divide by represented by one of the vertical reference numerals 25. The student then inserts the tokens 80 into the first channel defined by horizontal reference numeral 1 until the tokens 80 are at a height equal to the vertical slider member 40. The student counts the number of tokens 80 inserted into the housing 20 so that when the total number of tokens 80 inserted equals the number being divided they will stop inserting tokens 80. The student would then continue inserting tokens 80 into the next channel until the vertical row represented by the horizontal slider member 50 was filled in up to the vertical slider member 40. This process continues until the total number of tokens 80 inserted equals the number being divided. The total number of channels filled to the level of the vertical slider member 40 represents the answer to the division problem. If there are any channels not completely filled to the level of the vertical slider member 40, these tokens 80 represent the "remainder" left after dividing the number.

For example, if the student was to calculate value of 16 divided by 8, the student would first position the vertical slider member 40 to the vertical reference numeral 25 identified as 8 as shown in FIG. 1 of the drawings. The user would then insert tokens 80 into the first channel on the left side of the housing 20 until the height of the tokens 80 equaled the position of the vertical slider member 40 while counting the number of tokens 80 inserted which would be 8 (e.g. 1, 2, 3, 4, 5, 6, 7, 8). The user would then insert tokens 80 into the second channel of the housing 20 identified with the horizontal slider member 50 until the height of the tokens 80 equaled the position of the vertical slider member 40 while counting the number of tokens 80 inserted which would be 16 (e.g. 9, 10, 11, 12, 13, 14, 15, 16). Since the total number of tokens 80 inserted into the housing 20 equals the number being divided (i.e. 16), the user would terminate the insertion of the tokens 80 into the housing 20 as shown in FIG. 1 of the drawings. The student would then position the horizontal slider member 50 beneath the last completely full channel to indicate the answer to the division problem. The student would then either count the number of channels filled to the level of the vertical slider member 40 or determine the position of the horizontal slider member 50 which is 2 which represents the answer to the division problem of 16 divided by 8. After the student is finished calculating, the student then may grasp the stopper member 60 pulling the stopper member 60 outwardly from the housing 20 until the end flange 68 engages one of the partition members 29 which then aligns the openings 69 of the stopper member 60 with the channels within the housing 20 thereby allowing the release of the tokens 80 through the openings 69 through the lower opening 23 of the housing 20 onto a surface. The student then repositions the stopper member 60 inwardly to realign the cross members 64 with the channels to prevent future tokens 80 from fall through the lower opening 23 within the housing 20 as shown in FIGS. 4 and 5 of the drawings.

Another example of division with "remainders" is illustrated in FIG. 2 of the drawings. If the student was to calculate value of 20 divided by 9, the student would first position the vertical slider member 40 to the vertical reference numeral 25 identified as 9 as shown in FIG. 2 of the drawings. The user would then insert tokens 80 into the first channel on the left side of the housing 20 until the height of the tokens 80 equaled the position of the vertical slider member 40 while counting the number of tokens 80 inserted which would be 9 (e.g. 1, 2, 3, 4, 5, 6, 7, 8, 9). The user would then insert tokens 80 into the second channel of the housing 20 identified with the horizontal slider member 50 until the height of the tokens 80 equaled the position of the vertical slider member 40 while counting the number of tokens 80 inserted which would be 16 (e.g. 10, 11, 12, 13, 14, 15, 16, 17, 18). The user would then insert tokens 80 into the third channel of the housing 20 identified with the horizontal slider member 50 until the total number of tokens 80 inserted is 20 which is the number being divided (e.g. 19, 20). The student would then position the horizontal slider member 50 beneath the last completely full channel to indicate the first part of the answer to the division problem. The student would then count the number of channels filled to the level of the vertical slider member 40 or the position of the horizontal slider member 50 which is 2 and then count the number of tokens 80 remaining within the next unfilled third channel which is 2 which represents the answer to the division problem of 20 divided by 9 (2 with remainder of 2).

D. Addition Calculations

The present invention can also be utilized to calculate addition mathematical problems. The user simply positions the vertical slider member 40 to the first number to be added and inserts the tokens 80 in the first channel until they have reached the level of the vertical slider member 40. The user then positions the vertical slider member 40 to the second number to be added and inserts the tokens 80 in the second channel until they have reached the level of the vertical slider member 40. If additional numbers are to be added the student simply moves the vertical slider member 40 with respect to each additional channel as can be appreciated.

For example, if the student is to calculate the mathematical equation of 4+6 the student would take the following steps. The student simply positions the vertical slider member 40 to the reference numeral 4 of the vertical reference numerals 25 and inserts 4 tokens 80 in the first channel until they have reached the level of the vertical slider member 40. The user then positions the vertical slider member 40 to the references numeral 6 of the vertical reference numerals 25 and inserts 6 tokens 80 in the second channel until they have reached the level of the vertical slider member 40. The student would either count the tokens 80 during or after the insertion thereof which equals the answer 10.

E. Subtraction Calculations

The present invention can also be utilized to calculate subtraction mathematical problems. The user simply positions the vertical slider member 40 to the first number to be subtracted from and inserts the tokens 80 in the first channel until they have reached the level of the vertical slider member 40. The user then positions the vertical slider member 40 to the second number to be subtracted. The student then counts the total number of tokens 80 positioned in the first column that are above the vertical slider member 40 thereby representing the answer to the subtraction problem.

For example, if the student was to calculate the mathematical equation of 9–2, they would insert 9 tokens 80 into the first channel then reposition the vertical slider member 40 to the reference numeral 2 of the vertical reference numerals 25. The student would then count the number of tokens 80 in the first column that were above the vertical slider member 40 which is 7.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

Index of Elements for Mathematics Teaching System

| ENVIRONMENTAL ELEMENTS | | |
|---|---|---|
| | | 40. Vertical Slider Member |
| | | 41. |
| | | 42. Ridge Members |
| | | 43. |
| | | 44. Arrow |
| | | 45. |
| | | 46. |
| | | 47. |
| | | 48. |
| | | 49. |
| 10. | Mathematics Teaching System | 50. Horizontal Slider Member |
| 11. | | 51. |
| 12. | | 52. |
| 13. | | 53. |
| 14. | | 54. |
| 15. | | 55. |
| 16. | | 56. |
| 17. | | 57. |
| 18. | | 58. |
| 19. | | 59. |
| 20. | Housing | 60. Stopper Member |
| 21. | Upper Opening | 61. |
| 22. | Side Members | 62. Handle |
| 23. | Lower Opening | 63. |
| 24. | Front Plate | 64. Cross Members |
| 25. | Vertical Reference Numerals | 65. |
| 26. | Apertures | 66. Nub |
| 27. | Horizontal Reference Numerals | 67. |
| 28. | Rear Plate | 68. End Flange |
| 29. | Partition Members | 69. Openings |
| 30. | Vertical Slots | 70. Rear Support Structure |
| 31. | | 71. |
| 32. | Horizontal Slots | 72. |
| 33. | | 73. |
| 34. | | 74. |
| 35. | | 75. |
| 36. | | 76. |
| 37. | | 77. |
| 38. | | 78. |
| 39. | | 79. |
| | | 80. Tokens |

I claim:

1. A mathematics teaching system, comprising:

a plurality of tokens;

a housing having an upper opening, a lower opening, and a plurality of apertures aligned within vertical and horizontal rows, wherein said plurality of tokens may be inserted into said upper opening;

a plurality of partition members vertically positioned within said housing defining a plurality of channels aligned with said plurality of apertures, wherein said plurality of channels receive said plurality of channels;

a plurality of vertical reference numerals positioned upon said housing adjacent said horizontal rows;

a plurality of horizontal reference numerals positioned upon said housing adjacent said vertical rows;

a vertical slider member slidably positioned upon a left side of said housing;

a horizontal slider member slidably positioned upon a lower portion of said housing; and a stopper member slidably positioned within said housing through all of said partition members for allowing selective stopping and releasing of said plurality of tokens within said channels;

wherein said stopper member includes a plurality of openings formed for allowing said tokens to pass through, wherein each of said plurality of openings are separated by a plurality of cross members that are capable of stopping the passage of said tokens through said lower opening of said housing;

wherein said stopper member further includes a handle and an end flange for preventing removal of said stopper member and for aligning said openings with said channels when said tokens are to be released.

2. The mathematics teaching system of claim 1, wherein said stopper member includes a nub positioned adjacent said handle for stopping the insertion of the stopper member to properly align the cross members with said plurality of channels to prevent release of said plurality of tokens.

3. The mathematics teaching system of claim 1, wherein said housing is comprised of a front plate having said plurality of apertures, a rear plate, and a pair of side members.

4. The mathematics teaching system of claim 3, wherein said front plate and said rear plate include a pair of opposing vertical slots for receiving a pair of ridge members within said vertical slider member.

5. The mathematics teaching system of claim 4, wherein said front plate and said rear plate include a pair of opposing horizontal slots for receiving a pair of ridge members within said horizontal slider member.

6. The mathematics teaching system of claim 1, wherein said vertical slider member and said horizontal slider member are comprised of a U-shaped structure.

7. The mathematics teaching system of claim 1, wherein said vertical slider member and said horizontal slider member each include an arrow upon an upper surface thereof.

8. A mathematics teaching system, comprising:
a plurality of tokens;
a housing having an upper opening, a lower opening, and a plurality of apertures aligned within vertical and horizontal rows, wherein said plurality of tokens may be inserted into said upper opening;
a rear support structure attached to a rear surface of said housing for supporting said housing at an angle with respect to a surface;
a plurality of partition members vertically positioned within said housing defining a plurality of channels aligned with said plurality of apertures, wherein said plurality of channels receive said plurality of channels;
a plurality of vertical reference numerals positioned upon said housing adjacent said horizontal rows;
a plurality of horizontal reference numerals positioned upon said housing adjacent said vertical rows;
a vertical slider member slidably positioned upon a left side of said housing;
a horizontal slider member slidably positioned upon a lower portion of said housing; and
a stopper member slidably positioned within said housing through all of said partition members for allowing selective stopping and releasing of said plurality of tokens within said channels;
wherein said stopper member includes a plurality of openings formed for allowing said tokens to pass through, wherein each of said plurality of openings are separated by a plurality of cross members that are capable of stopping the passage of said tokens through said lower opening of said housing;
wherein said stopper member further includes a handle and an end flange for preventing removal of said stopper member and for aligning said openings with said channels when said tokens are to be released.

9. The mathematics teaching system of claim 8, wherein said stopper member includes a nub positioned adjacent said handle for stopping the insertion of the stopper member to properly align the cross members with said plurality of channels to prevent release of said plurality of tokens.

10. The mathematics teaching system of claim 8, wherein said housing is comprised of a front plate having said plurality of apertures, a rear plate, and a pair of side members.

11. The mathematics teaching system of claim 10, wherein said front plate and said rear plate include a pair of opposing vertical slots for receiving a pair of ridge members within said vertical slider member.

12. The mathematics teaching system of claim 11, wherein said front plate and said rear plate include a pair of opposing horizontal slots for receiving a pair of ridge members within said horizontal slider member.

13. The mathematics teaching system of claim 8, wherein said vertical slider member and said horizontal slider member are comprised of a U-shaped structure.

14. The mathematics teaching system of claim 8, wherein said vertical slider member and said horizontal slider member each include an arrow upon an upper surface thereof.

15. A mathematics teaching system, comprising:
a housing having an upper opening, a lower opening, and a plurality of apertures aligned within vertical and horizontal rows, wherein a plurality of tokens may be inserted into said upper opening;
a plurality of partition members vertically positioned within said housing defining a plurality of channels aligned with said plurality of apertures, wherein said plurality of channels receive said plurality of channels;
a plurality of vertical reference numerals positioned upon said housing adjacent said horizontal rows;
a plurality of horizontal reference numerals positioned upon said housing adjacent said vertical rows;
a vertical slider member slidably positioned upon a left side of said housing;
a horizontal slider member slidably positioned upon a lower portion of said housing; and
a stopper member slidably positioned within said housing through all of said partition members for allowing selective stopping and releasing of said plurality of tokens within said channels;
wherein said stopper member includes a plurality of openings, wherein each of said plurality of openings are separated by a plurality of cross members;
wherein said stopper member includes a handle and an end flange for preventing removal of said stopper member and for aligning said openings with said channels.

16. The mathematics teaching system of claim 15, wherein said stopper member includes a nub positioned adjacent said handle for stopping the insertion of the stopper member to properly align the cross members with said plurality of channels to prevent release of said plurality of tokens.

17. The mathematics teaching system of claim 15, wherein said housing is comprised of a front plate having said plurality of apertures, a rear plate, and a pair of side members.

18. The mathematics teaching system of claim 17, wherein said front plate and said rear plate include a pair of opposing vertical slots for receiving a pair of ridge members within said vertical slider member.

* * * * *